April 28, 1964   P. G. McKINLEY   3,130,758
DOUBLE SAW CUTTING ASSEMBLY
Filed Dec. 6, 1962   3 Sheets-Sheet 1
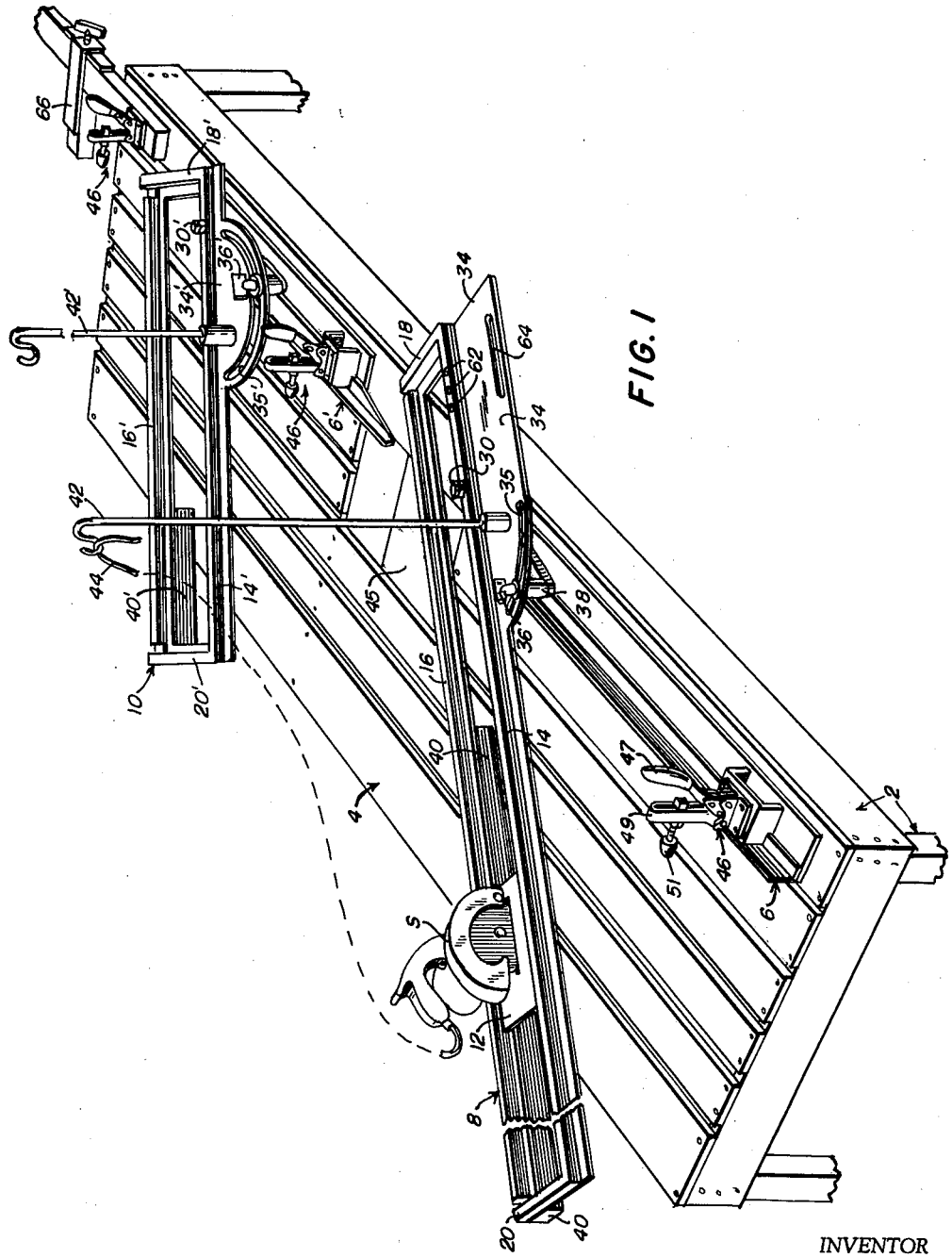
INVENTOR
PAUL G. McKINLEY
BY *Beale and Jones*
ATTORNEYS

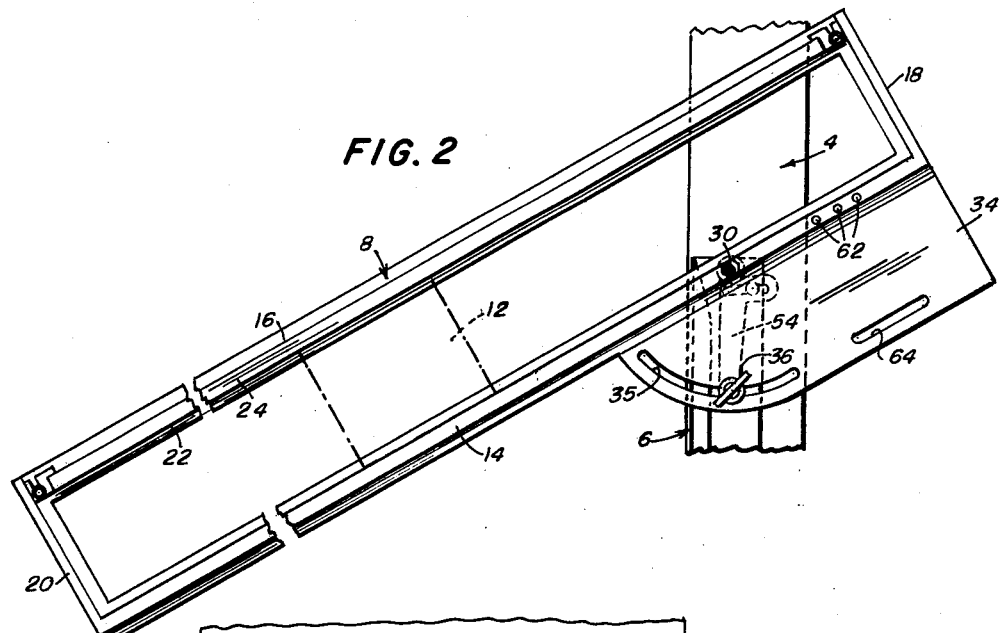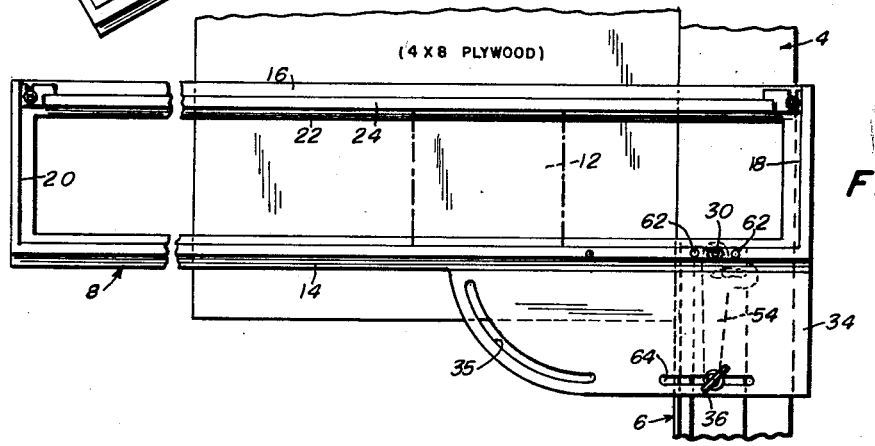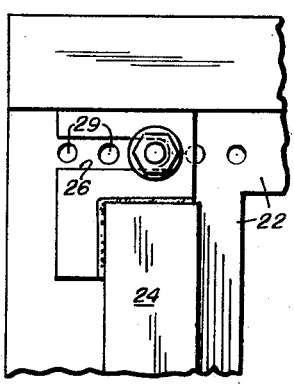

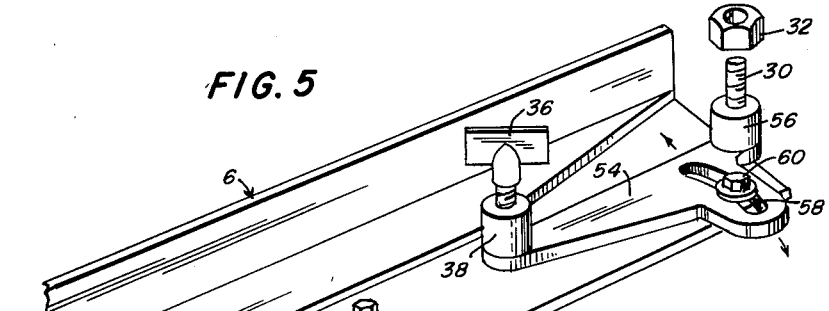
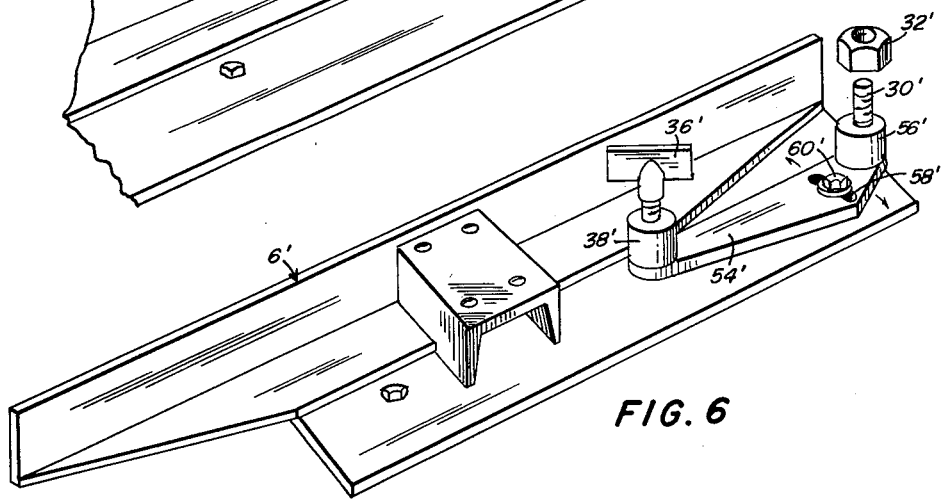
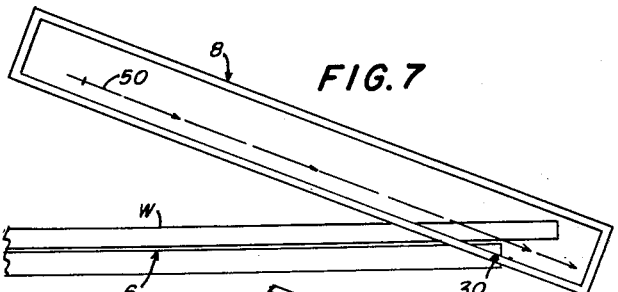
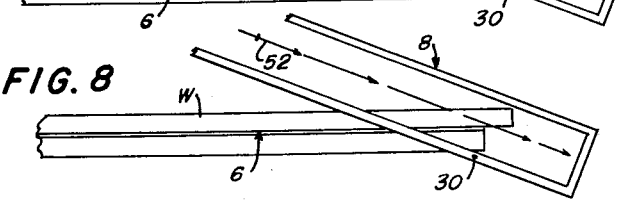
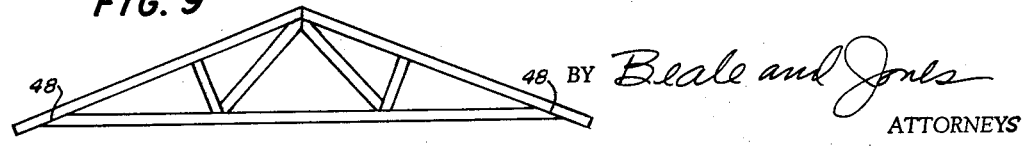

United States Patent Office 3,130,758
Patented Apr. 28, 1964

3,130,758
DOUBLE SAW CUTTING ASSEMBLY
Paul G. McKinley, Coral Gables, Fla., assignor to
Pagebar, Inc., a corporation of Florida
Filed Dec. 6, 1962, Ser. No. 242,761
1 Claim. (Cl. 143—6)

This invention relates to apparatus for cutting lumber, and more particularly to an assembly for making cuts of different angles at the ends of a single piece of lumber.

The instant invention may be applied to many tasks, but it is especially useful in making cuts on wooden framing members for building roof trusses. A growing field in the construction industry is the prefabricating of such truss members for buildings. This is often done in the general locality where the buildings are erected and the fabricated trusses are transported to the building site. The fabrication of the individual truss members is often done in a shop especially equipped for such purpose, and it is in such a shop that the double saw slide assembly of the instant invention is especially useful. As will be pointed out hereinafter, this saw arrangement solves many of the problems which have commonly occurred in this field.

It is an object of this invention to provide an efficient and inexpensive saw slide assembly for making cuts of different angles at each end of a wooden framing member. The development of the saw assembly disclosed herein will greatly lower the cost of equipment needed for the cutting of members for roof trusses, and therefore will enable many relatively small enterprises to enjoy the advantages of efficient power equipment.

Another object is to provide a saw slide which will enable a workman to make neater and more accurate cuts at a slight angle to the longitudinal axis of the lumber. This is achieved by having the pivot pin for the slide assembly capable of lateral movement so the saw blade will pass closely by the opening in the fence member.

Another object is to answer a need in the art for a saw table assembly which will minimize the handling of the workpieces between subsequent cuts. This is done by using a table with two sliding saws located thereabove, both being capable of angular adjustment in a horizontal plane, and this operation is aided by using a device for properly locating a piece of lumber on the saw table.

A further object is to offer to the trade a novel unit embodying a unitary saw fence member, pivot member, workpiece clamping device, and lock bolt for securing the slide assembly in a fixed angular position. This unit may readily be attached to any work surface to provide a radial saw assembly.

Other objects are to provide a saw assembly which is safe to use; and which inherently maintains the work area clear of ancillary apparatus and debris. These and other objects and advantages will be more clearly seen by reference to the accompanying description and drawings wherein;

FIG. 1 is a perspective view of the double saw cutting assembly of the instant invention;

FIG. 2 is a plan view of the long slide assembly and some of its related apparatus;

FIG. 3 is a plan view showing the long slide assembly in an alternate position, especially useful for making long perpendicular cuts on large wooden panels;

FIG. 4 is a detail view of a portion of the slide assembly, showing the adjustment means which enables the disclosed assembly to receive portable saws made by various manufacturers;

FIG. 5 is a perspective view of a portion of the fence assembly used with the long slide;

FIG. 6 is a perspective view of a portion of the fence assembly used with the short slide;

FIGS. 7 and 8 are diagrammatic views showing the effect of laterally shifting a pivot pin when various saws are used; and FIG. 9 shows a typical roof truss which may have its framing members cut on the saw assembly disclosed herein.

FIG. 1 shows the saw assembly as it is set up in a workshop and ready for operation. A workbench or table 2 is provided with a horizontal work support surface 4. To properly align a workpiece angularly on the work supporting surface, at least one fence member 6 is rigidly mounted on the work supporting surface. As shown, two slide assemblies 8 and 10 are supported above the work supporting surface. Each of these slide assemblies is designed to support and guide a portable power saw S for longitudinal movement therealong. Saws of this general type are well known and they are furnished by manufacturers with base plates 12 which are slidably mounted on the slide assemblies 8 and 10.

Due to the similarities of construction between the long slide assembly 8 and the short slide asembly 10, the corresponding parts of the assemblies are described by like number, the numbers on the short slide assembly 10 being further designated by a prime marking.

The slide assemblies may be described as being formed by a pair of parallel channel-like members 14 and 16 which are spaced apart by end portions 18 and 20. As best seen in FIG. 4, the channel-like members are each formed by a base plate 22 with a guide member 24 of square cross-section mounted thereon. The base plate supports the saw and the member 24 guides the saw along the desired path. Since the sizes of saw base plates 12 may vary between different manufacturers, means are provided for adjusting the spacing between the members of square cross-section. As shown, this is done by having one of the members 24 mounted for transverse movement by providing elongated slots 26 on the members 24. As shown, each elongated slot is in a small plate attached to the ends of a guide member 24. These slots 26 receive bolts 28 which are laterally fixed in the base plate 22, and which may be tightened to hold the channel-like members in the desired spaced relationship. A plurality of bolt holes 29 may be in plate 22, to provide a large latitude of adjustments.

The angle between each of the slide assemblies 8 and 10 and the fence 6 may be easily adjusted to any desired position by rotating the slide about a vertical pivot pin 30. A suitable aperture is located in the slide assembly to receive this pivot pin. The pivot pin 30 may be threaded and nuts 32 may be placed thereon to hold the slide assembly on the pin. When the slide is used for making angular cuts, two nuts 32 are preferably used, locked against each other and leaving the slide assembly free to turn. At the pivot point, the slide assembly is supported by a cylindrical boss 56 (FIG. 5) which is concentric with the pivot pin 30.

Means are also provided for locking the slide assembly in a fixed angular position. A plate-like member 34 is attached to channel member 14 and cut therein in an arcuate aperture 35, the central axis of which is the pivot pin 30. A lock bolt 36 with a winged head and threaded shank passes through a washer and through the arcuate aperture 35, fitting into a threaded hole in a cylindrical boss 38. By tightening the lock bolt 36, the plate 34 is snugly held against the boss 38, thus giving some support to the entire slide assembly, as well as locking it in a selected angular position.

It will be noted that the long slide assembly 8 is capable of moving through an angle of approximately ninety degrees, while the short slide assembly 10 moves through a considerably greater range of angles. This particular arrangement has proven adequate for making the cuts necessary for wooden roof trusses, but changes may obviously be made to make this adaptable to other uses.

To support the outer end of the slide assemblies, elongated supporting members 40 are attached to the underside of the channel-like member 16. These supporting members 40 rest on the work supporting surface 4 and they are of a suitable height to keep the slide assembly in a substantially horizontal plane. The use of such supporting members 40 makes it possible for the slide assemblies to assume a great range of angles without losing the end support. Also, the support is not in a workman's way since it is concealed beneath and moves with the channel member 16. This is a considerable advantage over prior art devices which have slide assembly supporting members securely attached to the work supporting surface.

In order to further assist in keeping the workplace clear, vertical rods 42 protrude upwardly from the plate members 34 to hold the electrical cords 44 for the power saws S. The rod 42 for the short slide assembly is not fully shown in the drawing, but is substantially the same as that shown at 42.

Relatively large holes 45 may be cut into the work supporting surface in the vicinity of the pivot pins 30 so that small pieces of lumber will fall therethrough to clear the work area.

Clamps 46 may be located along the fence 6 in order to hold a workpiece more securely while making a cut. The clamps illustrated are of the quick acting type and they are rapidly mounted upon the horizontal flange of the fence member, as best seen in FIG. 1. The clamps which are shown are constructed so that when handle 47 is pushed backwardly, the clamping arm 49 locks in a horizontal position over the workpiece, and the tip member 51 presses downwardly against the workpiece to hold it in position.

The long slide assembly 8 is used for making long cuts at very sharp angles to the lumber. Such cuts may sometimes be as long as forty-four inches and at extremely small angles, so the use of this apparatus greatly facilitates such an operation. These sharp cuts in building trusses are usually for the heel cut on the bottom chord, shown at 48 in FIG. 9. During installation in a building structure this measurement is used for aligning the trusses. It is therefore of considerable importance that these cuts be made as neatly and accurately as possible.

To obtain a clear, neat cut it is important that the lumber be snugly against the fence 6 and that the saw blade passes as close to the fence as practicable. This prevents excessive roughness and splintering of the workpiece at the feather edge. In order to enable a workman to adjust the saw support so the blade will pass closely by the fence, a lateral adjustment may be made in the position of the pivot pin 30. The effect of this adjustment may easily be seen by reference to FIGS. 7 and 8 where the adjustment of the pivot pin is shown in conjunction with the use of various saws.

The location of a saw blade relative to the saw base plate 12 will vary between the saws made by different manufacturers. In FIG. 7 the saw blade 50 is located on the right side of the saw base plate as seen by the operator; whereas the saw blade 52 in FIG. 8 is on the left side of the saw base plate. The wood being cut is shown at W. In FIG. 7 the pivot pin 60 is located reasonably close to the vertical flange of the fence 6 and it can be seen that this causes the blade to pass closely by the end of the fence.

However if the saw shown in FIG. 8 were used when the pivot pin were located near the vertical flange of the fence 6, the saw blade 52 would not pass close to the end of the fence and thus the cut would not be clean and neat. To avoid this, the pivot pin is moved away from the vertical flange of the fence member 6, and as seen in FIG. 8 this causes the saw blade to pass closely by the end of the fence, thus making a better cut.

Adjustment of the pivot pin may likewise be advantageous when the same saw is used, but set at different angles. For any given angular setting of the slide assembly 8, the pivot pin 30 may be relocated to enable the saw blade to pass closely by the fence member.

The structure employed for laterally adjusting the pivot pins may be seen in FIGS. 5 and 6. Pivotally mounted on the horizontal flange of the fence member 6 is a plate 54. A vertically oriented cylindrical boss 56 is located at the free end of the plate and the pivot pin extends upwardly therefrom. An elongated hole 58 is in the plate 54 and a lock bolt 60 extends therethrough to hold the plate and the connected pivot pin 30 in a selected position.

The clamps 46 are also mounted on the horizontal flange of the fence member 6 and the boss 38 for lock bolt 36 is mounted on the adjustable plate 54, thus providing an efficient unit which is readily attached to a work surface.

The long slide assembly 8 may also be used for taking long cuts on large sheets of material such as plywood sheathing. The manner in which this is done is shown in FIG. 3. In this position the slide assembly is held in a fixed position perpendicular to the fence. The entire slide assembly is remounted for taking such a cut. The pivot pin may be placed through any of a number of small apertures 62, located near the end of the slide assembly. The lock bolt 36 is passed through a straight elongated aperture 64 to prevent the slide assembly from being displaced angularly. The reason for providing more than one aperture 62 is that the saws made by different manufacturers are located in different positions on their saw base plates. The proper aperture 62 may be selected to obtain a cut of maximum length for any particular saw. Of course for making the perpendicular cut a single nut 32 may be used on the pivot pin 30 rather than the two lock nuts used when the slide assembly is pivotally mounted.

FIG. 9 shows a simple roof truss structure. As can readily be seen, each member therein has cuts at each end which are at different angles than the cut at the opposite end. Using conventional sawing arrangements it has been necessary to set up the saw and take a single cut in each framing member, stacking the framing members after they have been cut. Then the saw is set at the different angle and each piece is again moved to the saw, cut, and restacked. This procedure involves a considerable effort on the part of the workman in stacking and restacking the lumber, especially when large framing members are being handled. It also requires a sizeable workspace for stacking the materials and manipulating them.

The double slide saw assembly of the instant invention greatly reduces this effort. A workpiece may be placed on the work supporting surface 4, held by clamps 46, and one end cut by the saw on the short slide assembly. The workpiece may then be moved down the supporting surface until it abuts against the adjustable stop 66 (FIG. 1). Then a fine cut may be taken by the saw on the long slide assembly. The workpiece is then ready for fabrication into a truss assembly.

In addition to providing the numerous advantages discussed hereinabove, the saw slide assemblies are safer to use since the saw is pushed away from the operator, rather than pulled toward him. Hand saws of the type shown have sufficient safety shields to more full protect the operator than conventional swing or radial saws.

If desired, guide marks may be lined on the work supporting surface 4 for convenient resetting of the saw for frequently made cuts.

Having thus set out the structure and advantages of the invention, numerous modifications will occur to those skilled in the art. It is clearly understood that the invention is not limited by the exact embodiment described above, but by the claim which appears herebelow.

I claim:

A support assembly for a portable power saw comprising a slide assembly partially formed by two spaced apart horizontally disposed parallel channel members, said slide assembly having a pivot aperture adapted to receive a vertical pivot pin, means for locking said slide assembly at a selected angle about said pivot pin, at least one additional aperture in said slide assembly for alternately receiving said pivot pin, a non-arcuate aperture adapted to receive said locking means when said pivot pin is in one of said additional apertures; whereby said slide assembly may be placed at a desired predetermined angle by placing said additional aperture over said pivot pin and placing said non-arcuate aperture over said locking means.

References Cited in the file of this patent

UNITED STATES PATENTS

| | | |
|---|---|---|
| 2,513,497 | Laughlin | July 4, 1950 |
| 2,630,146 | Van Tuyl | Mar. 3, 1953 |
| 2,633,162 | Neuenschwander | Mar. 31, 1953 |
| 2,677,399 | Getsinger | May 4, 1954 |
| 2,735,456 | Grier et al. | Feb. 21, 1956 |
| 2,739,624 | Haddock | Mar. 27, 1956 |
| 2,803,271 | Shaw | Aug. 20, 1957 |
| 2,941,554 | Long | June 21, 1960 |